April 17, 1928.
C. E. PAGE
1,666,070
COFFEE MAKER
Filed Jan. 30, 1928
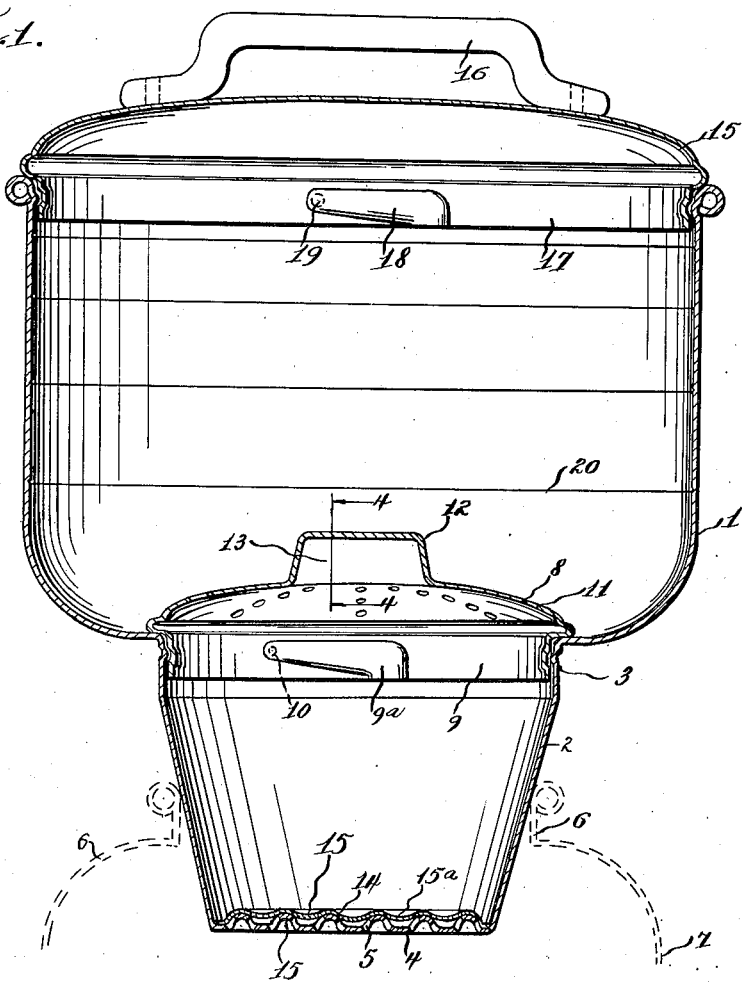
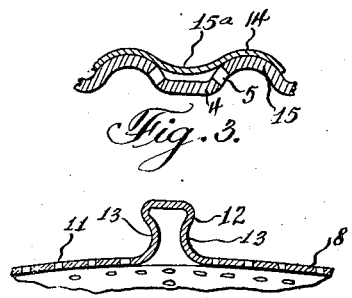
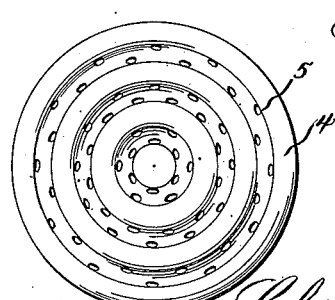
Charles E. Page, Inventor
By Lyon & Lyon
Attorneys Patented Apr. 17, 1928.

1,666,070

UNITED STATES PATENT OFFICE.

CHARLES E. PAGE, OF LOS ANGELES, CALIFORNIA.

COFFEE MAKER.

Application filed January 30, 1928. Serial No. 250,446. REISSUED

This invention relates to coffee makers such as are now in vogue for making drip coffee. This coffee is made by allowing hot water to drip through the ground coffee. Devices for this purpose usually include in their construction a holder for the ground coffee which is disposed below a water bowl in which the water is poured and from which it drips down through the coffee. The receptacle for the ground coffee is generally made removable from the bowl as a separate piece. It is also customary to provide filtering means, such as filter paper, in the bottom of the receptacle for the ground coffee, and this bottom is perforated to permit the dripping of the coffee through it.

The general object of this invention is to improve the general construction of coffee makers of this type; also to provide a construction which will enable the cost of the coffee makers to be reduced.

One of the objects of the invention is to construct the device so as to enable it to be used with coffee pots of different sizes.

One of the objects of the invention is to provide a form for the bottom of the receiver for the ground coffee which will operate to increase the effective area of the filtering paper.

It is customary to provide an inner cover for the receiver that holds the ground coffee at the bottom of the water bowl. This inner cover is perforated to permit the water to pass through the coffee from the bowl, and one of the objects of this invention is to provide an improved construction for this cover to reduce the cost of manufacture and to facilitate the locking of the cover in place. This is an advantageous feature of the invention because it prevents the swelling of the wet ground coffee from forcing the inner cover out of the coffee receiver in such a way as to flood the same with the water from the bowl.

Further objects of the invention will appear hereinafter.

The invention consists in the novel parts and combination of parts to be described hereinafter, all of which contribute to produce an efficient coffee maker.

A preferred embodiment of the invention is described in the following specification, while the broad scope of the invention is pointed out in the appended claims.

In the drawing:

Figure 1 is a vertical section through a coffee maker embodying my invention; and Figure 2 is a plan of the bottom or lower end of the coffee receiver.

Figure 3 is a vertical section through the bottom of the coffee receiver upon an enlarged scale, broken away and illustrating the relation of the filter paper to the corrugations in the bottom.

Figure 4 is a vertical section about on the line 4—4 of Fig. 1 broken away, and illustrating details of the construction of the handle for the cover of the coffee receiver.

In practicing the invention I provide a water bowl 1 which is preferably formed of sheet metal in the shape of a cylinder. This bowl may be spun from a sheet of metal in such a way that a downwardly projecting coffee receiver 2 is formed integral with the bowl. The body of this receiver 2 is of slightly conical shape and connected by a cylindrical neck 3 with the water bowl. The body 2 of the coffee receiver has a bottom 4 which is also integral with the body, and this bottom is foraminous. In the present instance, it is formed of a plate integral with the side of the coffee receiver and provided with perforations 5.

When in use, the coffee maker is inserted in the upper opening 6 in the upper end of a coffee pot 7 indicated by the dotted line. After the ground coffee has been placed in the receiver 2, its upper end is closed by means of an inner cover 8. This cover may be secured in place by means of one or more bayonet slots 9$^a$ cooperating with bosses such as at 10, projecting in from the side wall of the neck 3 of the device. The bayonet slots are formed by off-setting the material of the collar 9 as indicated.

The cover 8 is provided with perforations 11, and is also provided with an integral handle 12 struck up from the material and formed on its sides with concave faces 13 to operate as finger holds. This handle enables the cover to be rotated and lifted when disengaging it at the bayonet slots 9$^a$. The handle 12 is somewhat elongated, which facilitates the imparting of this rotary movement to the cover.

On the bottom 4 I provide a filtering mat 14, of suitable material such as filter paper. This mat is simply a disk of paper that is laid on the bottom (see Figure 1). The pressure of the coffee and the water on the upper side of this filter paper causes it to bend slightly to the contour of corrugations 15 which I form in the bottom. These corrugations are preferably of annular form and on their sides the perforations 5 are provided. They assist in preventing the filter paper 14 from becoming dislodged in a lateral direction in such a way as to expose the perforations which would permit coffee grounds to pass through into the coffee pot. By reason of the presence of the filter paper the coffee which drips through the bottom 4 is very clear and free from grounds and insoluble fats.

The corrugations should be deep enough and near enough to enable them to hold the filter paper in the zones 15ª out of contact with the perforations 5 which I form on the sides of the corrugations. It is preferable to have these perforations 5 on the sides rather than in the bottoms of the corrugations because in the latter case the paper becomes drawn down to the bottom of the corrugations and the effective filtering area of the paper becomes substantially the same as the area of the perforations. With the relation shown in Fig. 3 the effective filtering area is far greater than that of the perforations.

The word "principal" in the claims in referring to the perforations, means that the major part of the perforations are in the side walls. It is obvious that some minor unimportant perforations might be made either in the top or bottom of the corrugations, or in both, in addition to the side perforations, but these would have no substantial effect.

By reason of the fact that the bowl 1, the body 2 for the coffee, and the bottom 4 are integral, this part can be very economically manufactured in large quantities by means of suitable dies and the bottom will never wear out or become dislodged.

The water bowl 1 is provided with a cover 15 having a suitable handle 16. This cover is provided with a flange 17 that projects down into the lip of the bowl, and this flange is provided with a plurality of bayonet slots 18 similar to the bayonet slots 9ª. The lip of the bowl is provided with a plurality of bosses 19 to cooperate with these bayonet slots. I prefer to provide at least four of these bayonet slots to facilitate the proper alinement of the cover with the bowl in placing the cover upon it.

I also prefer to provide four of the bayonet slots 9ª for attaching the inner cover 8 on the coffee receiver 12.

By reason of the conical shape of the lower portion of the coffee receiver, it will be evident that this device can be used with coffee pots of different sizes, that is to say, coffee pots having openings at their upper ends of different diameters. The conical form of the coffee receiver also facilitates making the bowl and receiver in one piece.

The interior of the bowl is provided with a plurality of horizontal gauge lines 20 which correspond to different numbers of cups of coffee desired; that is to say, these lines indicate the point to which the bowl should be filled with water for making different amounts of coffee.

What I claim is:

1. In a coffee maker, the combination of a container in the form of a metal water bowl of relatively large diameter, said bowl having an extension of reduced diameter at its lower end, constituting a receptacle for the ground coffee, and adapted to be received in the upper opening of a coffee pot, said reduced extension having an integral bottom with corrugations formed therein with the principal perforations in the side walls of the corrugations, and operating to support a sheet of filter paper with the ground coffee disposed above the same, and a perforated cover for the reduced extension operating as a bottom for the said water bowl.

2. In a coffee maker, the combination of a container in the form of a metal water bowl of relatively large diameter, said bowl having an extension of reduced diameter at its lower end constituting a receptacle for the ground coffee and adapted to be received in the upper opening of a coffee pot, said reduced extension having an integral bottom with a plurality of annular corrugations with the principal perforations in the side walls of the corrugations, a sheet or filter paper supported on the said bottom, and a perforated cover for the reduced extension operating as a bottom for the said water bowl.

3. In a coffee maker, the combination of a container in the form of a metal water bowl of relatively large diameter, said bowl having an integral extension of reduced diameter at its lower end, constituting a receptacle for the ground coffee, and adapted to be received in the upper opening of a coffee pot, said reduced extension having an integral bottom with corrugations formed therein with the principal perforations in the side walls of the corrugations, and operating to support a sheet of filter paper with the ground coffee disposed above the same, a perforated cover for the reduced extension operating as a bottom for the said water bowl, and means for locking the cover in position.

4. In a coffee maker, the combination of a water bowl having a coffee receptacle extending downwardly therefrom, a perforated cover at the bottom of the bowl, said cover having an integral handle struck upwardly from the material forming the cover, said handle being of elongated form to facilitate rotation of the cover when in place, and a bayonet slot connection between the cover and the coffee receptacle to secure the cover in place.

5. A coffee maker consisting of a substantially cylindrical, relatively large bowl with an extension at its lower end, including a substantially cylindrical neck adjacent the bowl with a substantially conical extension below the neck and forming a receiver for the coffee, said receiver having a plurality of annular corrugations with perforations only in the sides thereof, said bowl having a plurality of gauge lines formed on the inner face thereof to indicate the quantity of water to be used in making different amounts of coffee.

6. In a coffee maker, the combination of a container in the form of a metal bowl of relatively large diameter, said bowl having an extension of reduced diameter at its lower end constituting a receptacle for the ground coffee, and adapted to be received in the upper opening of a coffeepot, said reduced extension having a bottom with corrugations formed therein with perforations only in the side walls of the corrugations, and operating to support a sheet of filter paper with the ground coffee disposed above the same, and a perforated cover for the reduced extension operating as a bottom for the said water bowl.

Signed at Los Angeles, California, this 25th day of January, 1928.

CHARLES E. PAGE.